United States Patent
Le et al.

(10) Patent No.: US 12,271,484 B2
(45) Date of Patent: Apr. 8, 2025

(54) FUZZING GUIDED BINARY HARDENING

(71) Applicant: INTERNATIONAL BUSINESS MACHINES CORPORATION, Armonk, NY (US)

(72) Inventors: Michael Vu Le, Danbury, CT (US); Sanjeev Das, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/812,190

(22) Filed: Jul. 13, 2022

(65) Prior Publication Data
US 2024/0020389 A1    Jan. 18, 2024

(51) Int. Cl.
G06F 21/00    (2013.01)
G06F 21/56    (2013.01)
G06F 21/57    (2013.01)

(52) U.S. Cl.
CPC .......... G06F 21/577 (2013.01); G06F 21/568 (2013.01)

(58) Field of Classification Search
CPC ...... G06F 21/56; G06F 21/566; G06F 21/568; G06F 21/577
See application file for complete search history.

(56) References Cited

U.S. PATENT DOCUMENTS

| | | | |
|---|---|---|---|
| 8,539,449 B2 | 9/2013 | Kim | |
| 9,866,583 B2 | 1/2018 | Adams | |
| 10,380,350 B1 | 8/2019 | Ben Porath | |
| 10,452,526 B2 | 10/2019 | Rajpal | |
| 10,678,677 B1* | 6/2020 | Kuris | G06F 11/3624 |
| 2022/0335135 A1* | 10/2022 | McGraw | G06F 11/3684 |
| 2022/0385691 A1* | 12/2022 | Duplys | H04L 41/046 |
| 2023/0169177 A1* | 6/2023 | Bishop, III | G06F 8/71 726/25 |

(Continued)

FOREIGN PATENT DOCUMENTS

| | | |
|---|---|---|
| CN | 101930398 B | 12/2010 |
| CN | 103699480 B | 4/2014 |

(Continued)

OTHER PUBLICATIONS

Ding, R., Performant Software Hardening Under Hardware Support, A Dissertation Presented to The Academic Faculty, In Partial Fulfillment of the Requirements for the Degree Doctor of Philosophy in the School of Computer Science, College of Computing, Georgia Institute of Technology, May 2021, 102 pgs.

(Continued)

*Primary Examiner* — Joseph P Hirl
*Assistant Examiner* — Chi D Nguy
(74) *Attorney, Agent, or Firm* — Stosch Sabo

(57) ABSTRACT

Described are techniques for application hardening. The techniques include generating application traces using fuzzing for an application with a known security vulnerability, where the application traces include good traces that do not result in exploitation of the known security vulnerability and bad traces that result in exploitation of the known security vulnerability. The techniques further include identifying code segments that are executed by the bad traces and not executed by the good traces. The techniques further include modifying the identified code segments using binary rewriting.

20 Claims, 7 Drawing Sheets

(56) References Cited

U.S. PATENT DOCUMENTS

| | | | | |
|---|---|---|---|---|
| 2023/0336575 | A1* | 10/2023 | Ackerman | H04L 43/028 |
| 2023/0351024 | A1* | 11/2023 | Cook | H04L 63/00 |

FOREIGN PATENT DOCUMENTS

| | | |
|---|---|---|
| CN | 110401581 B | 11/2019 |
| CN | 112347484 A | 2/2021 |

OTHER PUBLICATIONS

Groß, S., "FuzzIL: Coverage Guided Fuzzing for JavaScript Engines", Masters Thesis, Institute of Theoretical Informatics, Competence Center for Applied Security Technology, Department of Informatics, Karlsruhe Institute of Technology, Oct. 29, 2018, 60 pgs.

Heo, et al., "Effective Program Debloating via Reinforcement Learning", Conference on Computer and Communications Security, CCS '18, Oct. 15-19, 2018, Toronto, ON, Canada, 15 pgs.

Kuo, et al., "Set the Configuration for the Heart of the OS: On the Practicality of Operating System Kernel Debloating", Proceedings of the ACM on Measurement and Analysis of Computing Systems, vol. 4, Issue 1, Mar. 2020, Article No. 03, 27 pgs., <https://doi.org/10.1145/3379469>.

Mell et al., "The NIST Definition of Cloud Computing", National Institute of Standards and Technology, Special Publication 800-145, Sep. 2011, 7 pages.

Rastogi, et al., "Cimplifier: Automatically Debloating Containers", ESEC/FSE 2017: Proceedings of the 2017, 11th Joint Meeting on Foundations of Software Engineering, Sep. 4-8, 2017, Paderborn, Germany, 11 pgs., <https://doi.org/10.1145/3106237.3106271>.

Tang, et al., XDebloat: Towards Automated Feature-Oriented App Debloating, in IEEE Transactions on Software Engineering, vol. 14, No. 8, Aug. 2015, 19 pgs., doi: 10.1109/TSE.2021.3120213.

Wu, et al., "LIGHTBLUE: Automatic Profile-Aware Debloating of Bluetooth Stacks", 30th USENIX Security Symposium, August 11-13. 2021, 19 pgs.

* cited by examiner

FUZZING GUIDED BINARY HARDENING

STATEMENT REGARDING FEDERALLY SPONSORED RESEARCH OR DEVELOPMENT

This invention was made with Government support under W912CG-19-C-0003 awarded by the Defense Advanced Research Projects Agency (DARPA). The Government has certain rights to this invention.

BACKGROUND

The present disclosure relates to computer security, and, more specifically, to software hardening.

Hardening refers to the process of reducing vulnerabilities (e.g., attack vectors, exploits, etc.) associated with a computational system. Hardening can be as simple as removing unused or redundant features (e.g., unused software, etc.), updating default features (e.g., updating default passwords, etc.), installing cybersecurity software, and/or upgrading existing software (e.g., installing patches, etc.).

SUMMARY

Aspects of the present disclosure are directed toward a computer-implemented method comprising generating application traces using fuzzing for an application with a known security vulnerability, where the application traces include good traces that do not result in exploitation of the known security vulnerability and bad traces that result in exploitation of the known security vulnerability. The method further comprises identifying code segments that are executed by the bad traces and not executed by the good traces. The method further comprises modifying the identified code segments using binary rewriting.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
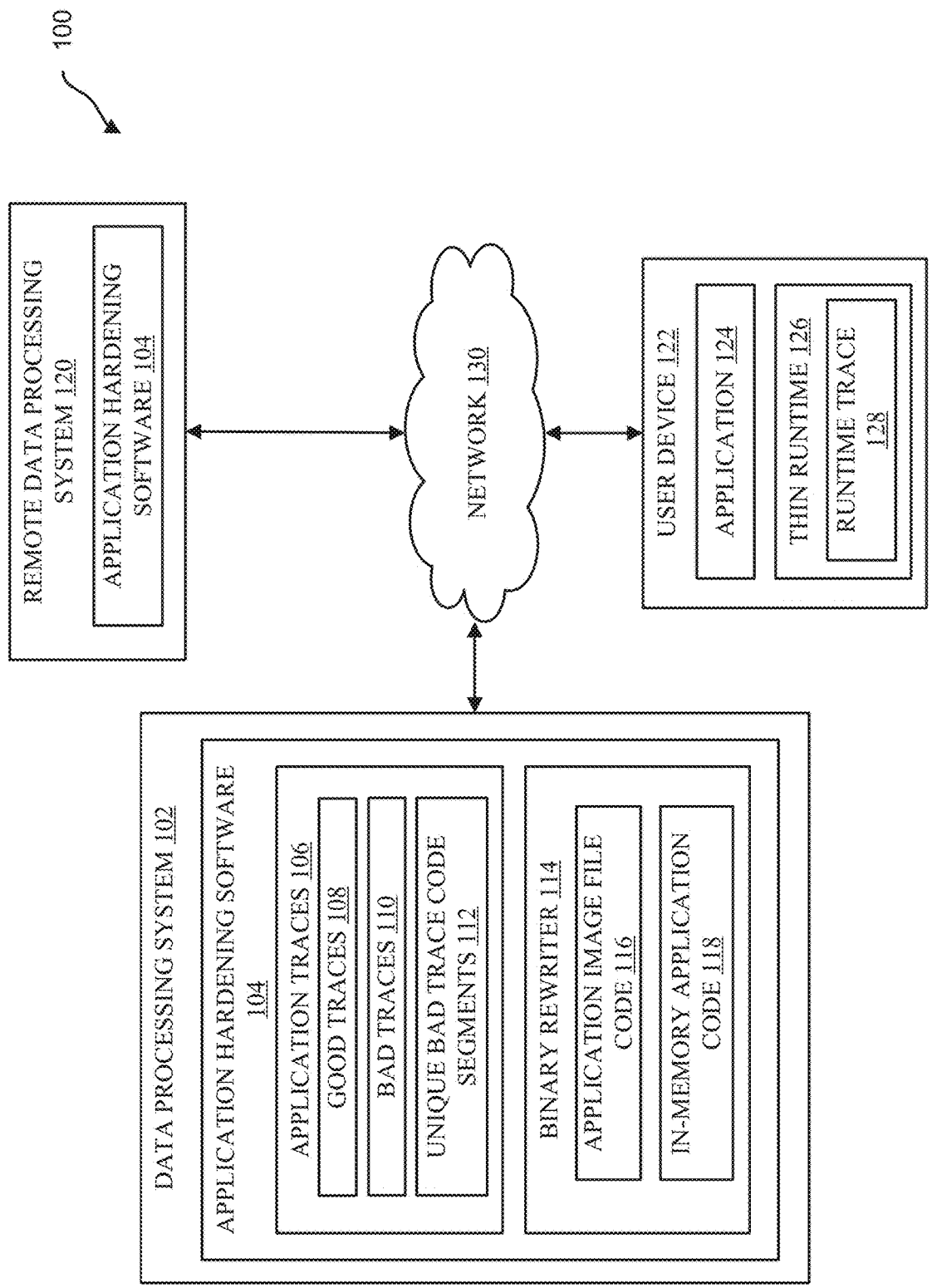
FIG. 1 illustrates a block diagram of an example computational environment implementing application hardening software, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward computer security, and, more specifically, to software hardening. While not limited to such applications, embodiments of the present disclosure may be better understood in light of the aforementioned context.

Software vulnerabilities take time to discover. Once discovered, yet more time is needed to develop and distribute a fix (e.g., an update, patch, etc.) to the software vulnerability. Thus, from discovery to resolution, there is a time period where a known software vulnerability remains exposed. Aspects of the present disclosure are directed to addressing the aforementioned challenge by enabling software (e.g., an application) to safely execute between the time a software vulnerability is discovered and until a patch can be applied to remedy the software vulnerability.

More specifically, aspects of the present disclosure can use fuzzing to generate two sets of application traces (e.g., in the vicinity of the known software vulnerability). The two sets of application traces include good traces (e.g., those that do not lead to an exploit, crash, or other compromise) and bad traces (e.g., those that lead to an exploit, crash, or other compromise). Aspects of the present disclosure can then identify unique code segments that only occur in the bad traces and not in the good traces. Aspects of the present disclosure can then modify (e.g., using binary rewriting) the identified unique code segments (e.g., replacing them with trapping instructions, etc.). Subsequently, during execution of the application, aspects of the present disclosure can maintain a moving window for monitoring a back trace of the application. If the identified unique code segments are detected in the back trace, and if the back trace matches (at least in part) a bad trace, then aspects of the present disclosure can perform a mitigation action (e.g., terminate the application, generate a notification, etc.).

Advantageously, aspects of the present disclosure can improve the security of applications with known software vulnerabilities before there is an available patch to permanently resolve the known software vulnerability. Furthermore, aspects of the present disclosure require very little computational overhead. Further still, aspects of the present disclosure exhibit low false positives insofar as aspects of the present disclosure can base a detected exploit on (i) the execution of a code segment unique to the bad traces, and (ii) a back trace of the executed application matching, at least in part, a known bad trace.

Referring now to the figures, FIG. 1 illustrates a block diagram of an example computational environment 100 implementing application hardening software 104, in accordance with some embodiments of the present disclosure. The computational environment 100 includes a data processing system 102, remote data processing system 120, and user device 122 communicatively coupled to one another via a network 130. The network 130 can be a local area network (LAN), a wide area network (WAN), an intranet, the Internet, or any other network 130 or group of networks 130 capable of continuously, semi-continuously, or intermittently connecting (directly or indirectly) the aforementioned components together.

Application hardening software 104 can be executed on the data processing system 102. In some embodiments, the application hardening software 104 is downloaded to the data processing system 102 from a remote data processing system 120. In some embodiments, different aspects of the application hardening software 104 are implemented by two or more of the data processing system 102, the remote data processing system 120, and/or the user device 122.

Application hardening software 104 can be configured to generate application traces 106 for an application 124. The application traces 106 can include good traces 108 (e.g., those traces that do not result in a crash, exploit, or other compromise of the application 124) and bad traces 110 (e.g., those traces that do result in a crash, exploit, or other compromise of the application 124). The application hardening software 104 can compare the good traces 108 and the bad traces 110 to identify unique bad trace code segments 112 (e.g., those code segments which occur in the bad traces 110 and not the good traces 108).

The application hardening software 104 can provide the unique bad trace code segments 112 to a binary rewriter 114. The binary rewriter 114 can modify the code at the unique bad trace code segments 112 to render them safe from the known software vulnerability. For example, the binary rewriter 114 can modify the unique bad trace code segments 112 to convert them to trapping instructions. The binary rewriter 114 can modify the unique bad trace code segments 112 in the application image file code 116 and/or the in-memory application code 118. In some embodiments, the application image file code 116 can refer to source code for the application 124 that may be downloaded from a repository. In some embodiments, the in-memory application code 118 can refer to an individual version of the application 124 previously downloaded to a particular device (e.g., user device 122).

The application hardening software 104 is further configured to provide a thin runtime 126 for monitoring a runtime trace 128 of the application 124 while it executes on a user device 122 (e.g., after the application 124 has been updated by the binary rewriter 114). The application hardening software 104 is configured to monitor the runtime trace 128 for execution of the unique bad trace code segments 112. If execution of the unique bad trace code segments 112 is detected, the application hardening software 104 can compare the runtime trace 128 to the bad traces 110. If there is a match (or partial match), then the application hardening software 104 can perform a mitigation action (e.g., by terminating the application 124 on the user device 122, generating a notification, etc.).

The data processing system 102, the remote data processing system 120, and the user device 122 can be any computer, server, mainframe, virtual machine (VM), container, tablet, notebook, smartphone, other computer hardware (physical or virtualized), multiples of the aforementioned, and/or combinations of the aforementioned. As will be appreciated by one skilled in the art, FIG. 1 is representative of some embodiments of the present disclosure but should not be construed as limiting. In other embodiments, more or fewer similar or dissimilar components than the components shown in FIG. 1 can be present. Furthermore, in various embodiments, the components shown in FIG. 1, if they are present at all, can be combined together into unified components or separated into discrete components.

Figure 2:
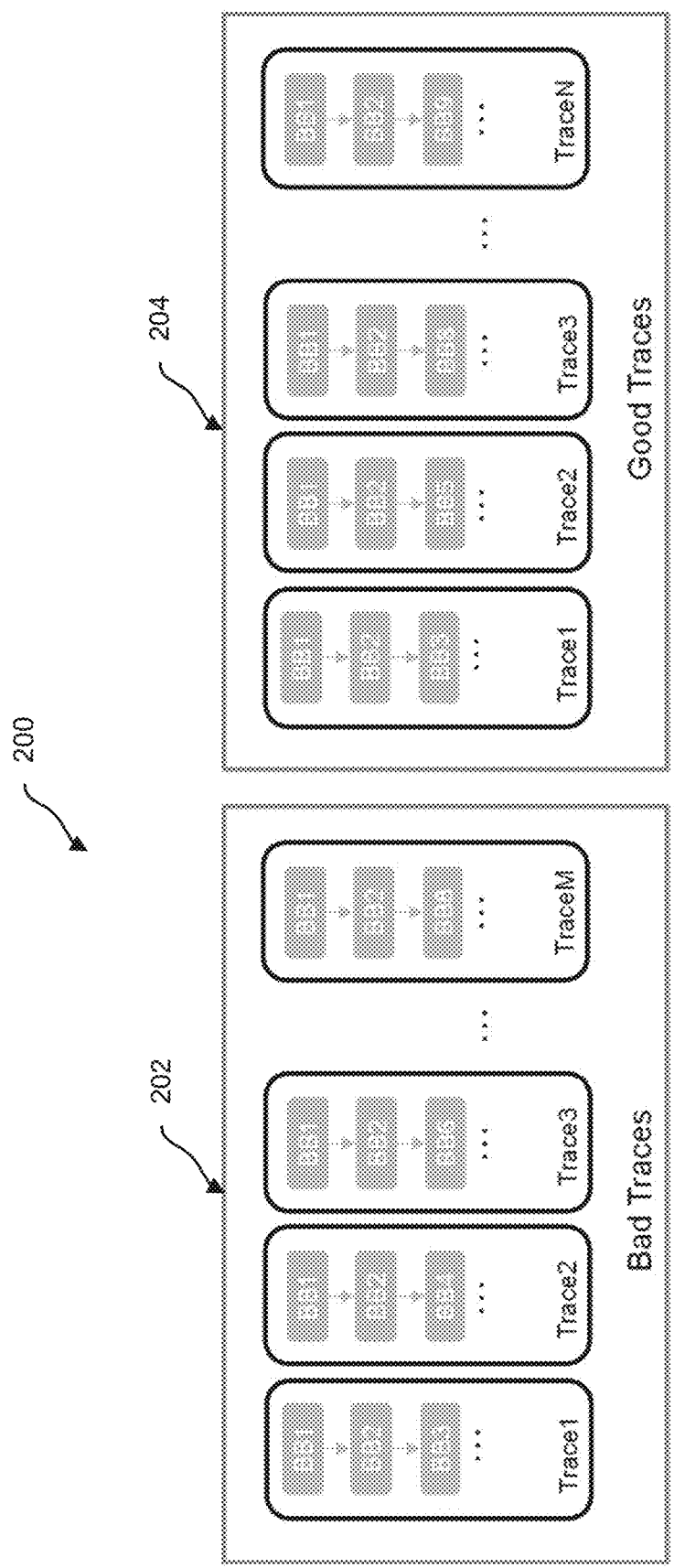
FIG. 2 illustrates a block diagram of example application traces, in accordance with some embodiments of the present disclosure.

FIG. 2 illustrates a block diagram of example application traces 200, in accordance with some embodiments of the present disclosure. The application traces 200 include bad traces 202 and good traces 204. The application traces 200, bad traces 202, and good traces 204 can be consistent with the application traces 106, bad traces 110, and good traces 108, respectively, as previously described with respect to FIG. 1. As shown in FIG. 2, the application traces 200 are each made up of respective blocks (e.g., BB1, BB2, BB3, BB4, BB5, BB6, BB8, and BB9) separated into respective traces (e.g., trace1, trace2, trace3, and traceM for the bad traces 202 and trace1, trace2, trace3, and traceN for the good traces 204, where M and N are respective integers representing any number of bad traces 202 and good traces 204). The respective blocks can represent code segments (e.g., functions, calls, variables, names, locations, etc.). Each unique sequence of blocks can represent an application trace 200, where each of the application traces 200 are categorized as either bad traces 202 (e.g., those traces that result in a security exploit) or good traces 204 (e.g., those traces that do not result in a security exploit).

Aspects of the present disclosure can compare the bad traces 202 to the good traces 204 to identify unique bad trace code segments. The unique bad trace code segments can be represented by respective blocks that appear in the bad traces 202 but do not appear in the good traces 204. As shown in FIG. 2, the unique bad trace code segments can be BB4 and BB6.

Figure 3:
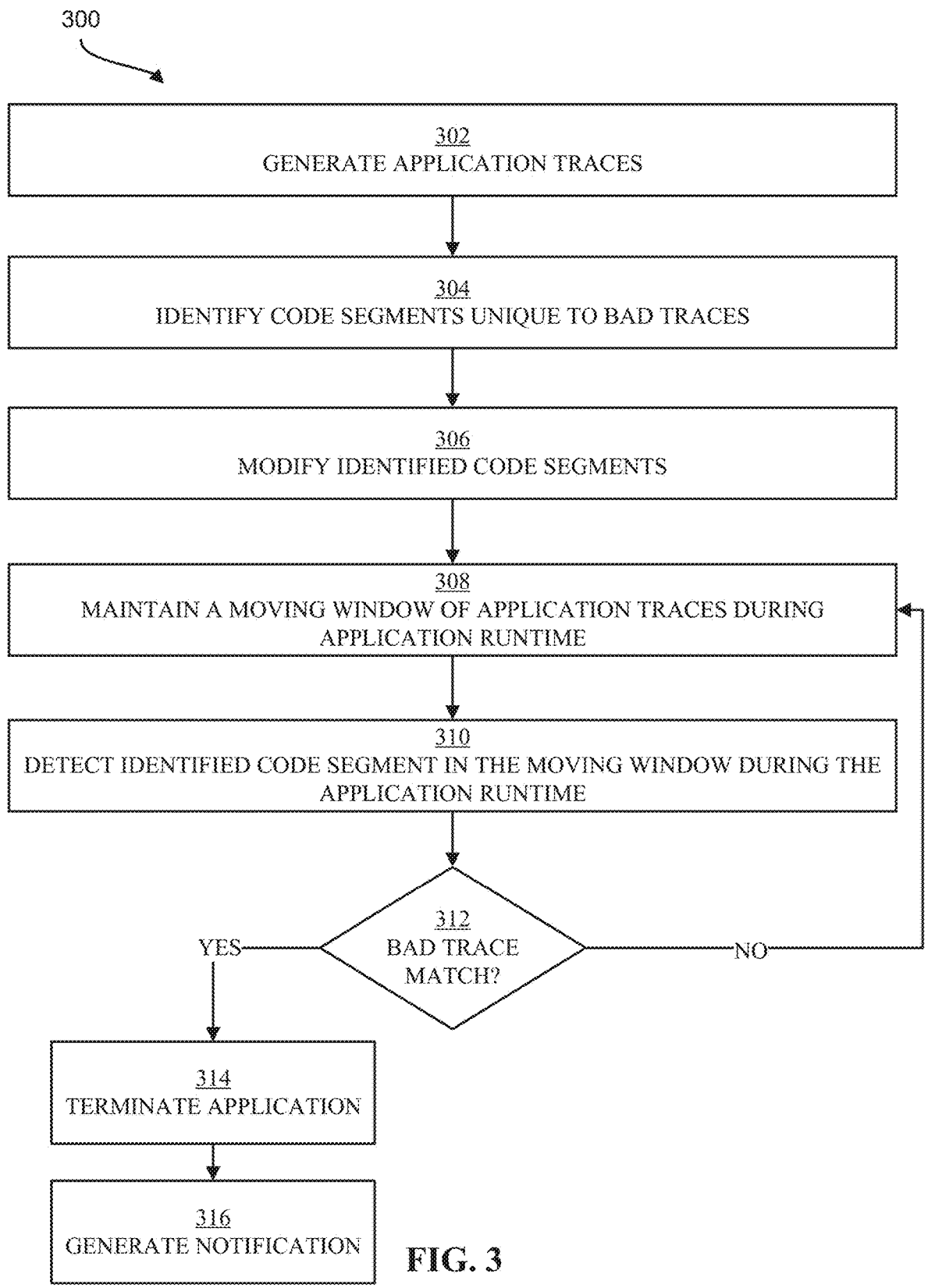
FIG. 3 illustrates a flowchart of an example method for application hardening, in accordance with some embodiments of the present disclosure.

FIG. 3 illustrates a flowchart of an example method 300 for application hardening, in accordance with some embodiments of the present disclosure. The method 300 can be implemented by, for example, a data processing system (e.g., data processing system 102 and/or remote data processing system 120 of FIG. 1), a computer, a processor, a user device (e.g., user device 122 of FIG. 1), and/or another configuration of hardware and/or software.

Operation 302 can include generating application traces (e.g., application traces 106 of FIG. 1 and/or application traces 200 of FIG. 2). In some embodiments, the application traces are generated based on information from a known security exploit. In some embodiments, the application traces are generated using fuzzing.

As used herein, fuzzing can refer to any programming or software development techniques that automatically create random, invalid, unexpected, or otherwise automated inputs to a software program, computer program, and/or application. Once the automated inputs are provided, the corresponding program can be implemented and monitored. The monitoring can involve identifying successful implementation, crashes, memory leaks, failures, and/or other execution results. Fuzzing can be utilized on an entirety of a software program, computer program, and/or application, or on a portion thereof. For example, in some cases, fuzzing is performed to identify bugs or vulnerabilities in particular attack vectors (e.g., file uploads) or in particular edge cases (e.g., inputs which aren't explicitly invalid, but are still unexpected). Fuzzing, as discussed herein, can be performed by a fuzzer (e.g., a set of computer executable instructions, a module, etc.). The fuzzer can be generation-based or mutation-based; structured, or unstructured; and classified as a white-box, a gray-box, or a black-box fuzzer.

Operation 304 includes identifying code segments unique to the bad traces. Operation 304 can utilize comparison algorithms to identify code segments that appear in the bad traces and do not appear in the good traces.

Operation 306 includes modifying the code segments unique to the bad traces. In some embodiments, operation 306 includes modifying, adding, and/or replacing the code segments unique to the bad traces with trapping instructions. In some embodiments, trapping instructions can be configured to pause or suspend application execution (e.g., to delay completion of a security vulnerability exploit). In some embodiments, trapping instructions can be configured to generate a notification (e.g., invoke a kernel routine to make a system call). In some embodiments, operation 306 utilizes binary rewriting to modify the code segments unique to the bad traces. Binary rewriting can refer to static or dynamic techniques for altering a compiled program (whether non-linked, linked, or dynamically linked) without access to the source code and in such a way that the altered compiled program remains executable. Operation 306 can modify the codes segments unique to the bad traces in the application image file code (e.g., application image file code 116 of FIG. 1) and/or the in-memory application code (e.g., in-memory application code 118 of FIG. 1).

Operation 308 includes maintaining a moving window of application traces during application runtime. In some embodiments, operation 308 is implemented using a thin runtime (e.g., thin runtime 126 of FIG. 1) executed in conjunction with the application (e.g., application 124 of FIG. 1) on a user device (e.g., user device 122 of FIG. 1). In some embodiments, the moving window is a relatively small window of sufficient size to quickly detect a possible security exploit yet small enough to be relatively computationally lightweight to implement.

Operation 310 includes detecting one of the code segments unique to the bad traces in the moving window during execution of the application. Operation 312 includes determining if the back trace (e.g., the sequence of code tracked in the moving window) including the detected code segment matches (or partially matches such that the partial match satisfies a threshold similarity) one of the bad traces. If not (312: NO), then the method 300 returns to operation 308 and continues maintaining the moving window of application traces. If so (312: YES), then the method 300 proceeds to classify the back trace as a security exploit and perform a mitigation action. For example, operation 314 can include terminating the application. As another example, operation 316 can include generating a notification. The generated notification can be transmitted and/or presented to a user or administrator. The generated notification can identify the detected security exploit, a time of the security exploit, a device running the application associated with the security exploit, any mitigation actions performed, and/or other information.

Figure 4:
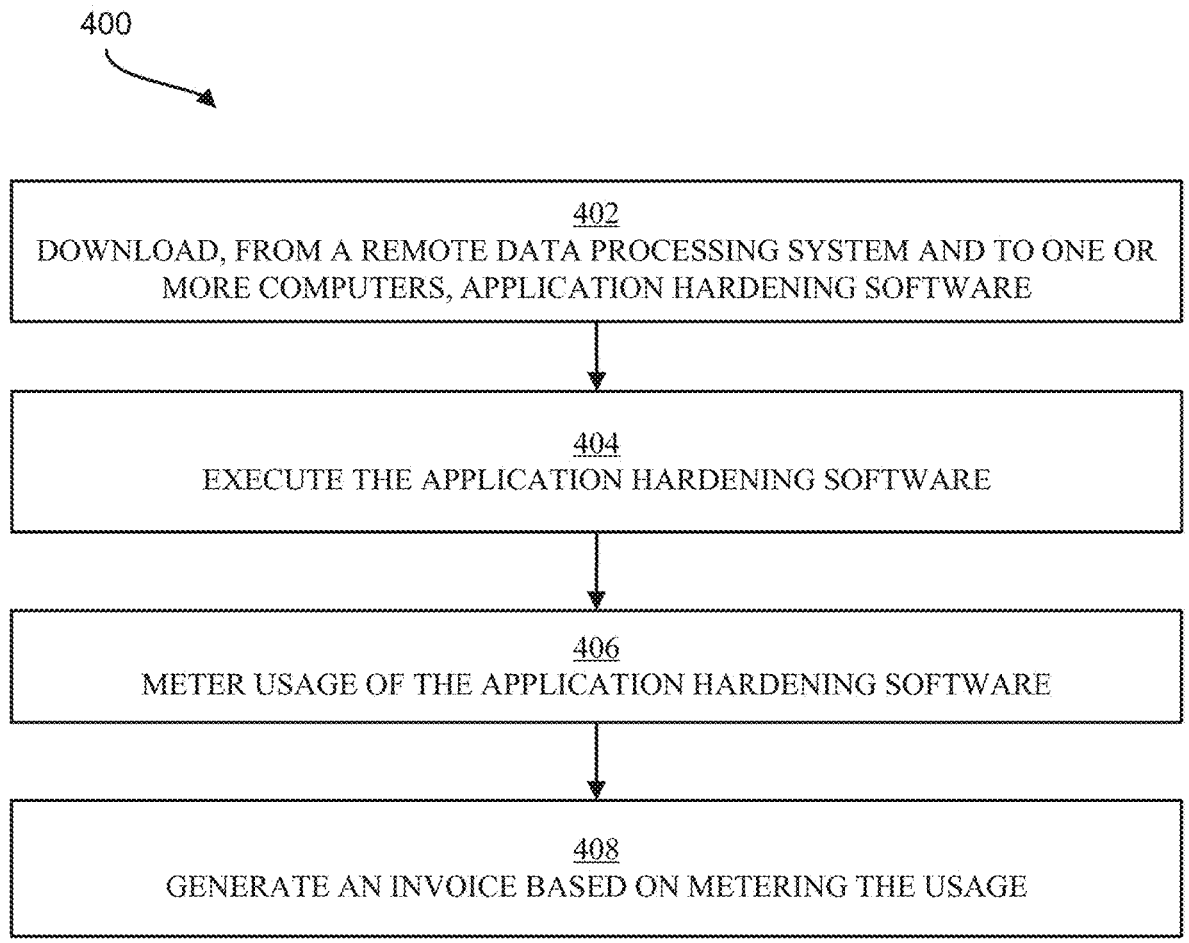
FIG. 4 illustrates a flowchart of an example method for downloading, deploying, metering, and billing usage of application hardening software, in accordance with some embodiments of the present disclosure.

FIG. 4 illustrates a flowchart of an example method 400 for downloading, deploying, metering, and billing usage of application hardening software, in accordance with some embodiments of the present disclosure. The method 400 can be implemented by, for example, a data processing system (e.g., data processing system 102 and/or remote data processing system 120 of FIG. 1), a computer, a processor, a user device (e.g., user device 122 of FIG. 1), and/or another configuration of hardware and/or software. In some embodiments, the method 400 occurs contemporaneously with any of the previously described methods.

Operation 402 includes downloading, from a remote data processing system (e.g., remote data processing system 120 of FIG. 1) and to one or more computers (e.g., data processing system 102 of FIG. 1), application hardening software (e.g., application hardening software 104 of FIG. 1). Operation 404 includes executing the application hardening software. Operation 404 can include performing any of the methods and/or functionalities discussed herein. Operation 406 includes metering usage of the application hardening software. Usage can be metered by, for example, an amount of time the application hardening software is used, a number of endpoints monitored by the application hardening software, a number of applications modified and/or monitored by the application hardening software, an amount of resources consumed by implementing the application hardening software, and/or other usage metering metrics. Operation 408 includes generating an invoice based on metering the usage.

Figure 5:
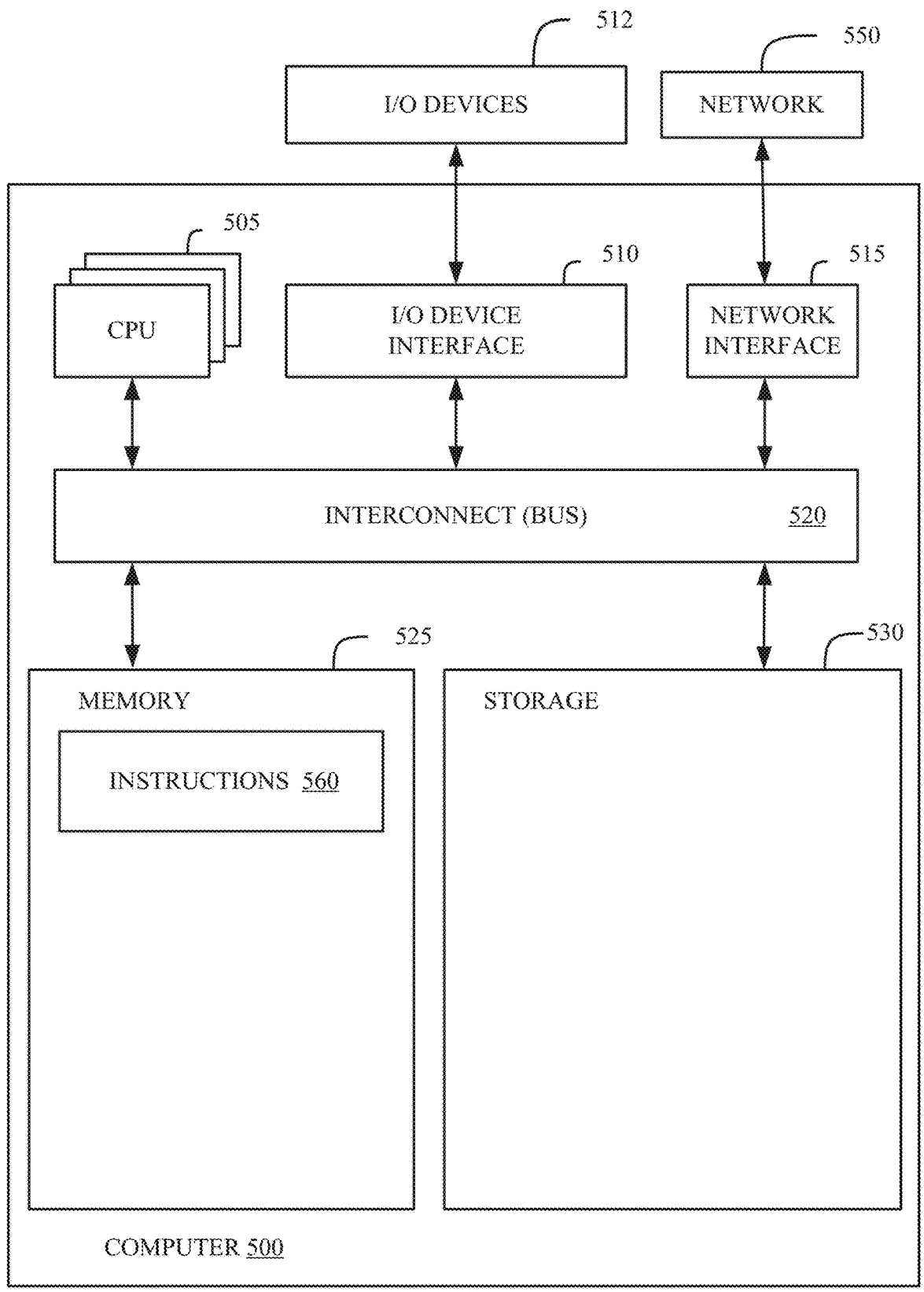
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all portions of the methods described previously and/or implement any or all portions of the functionalities described previously. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine (e.g., data processing system 102 of FIG. 1) such that the client machine executes the method, or a portion of the method, based on the instructions provided by computer 500. In some embodiments, the computer 500 is incorporated into (or functionality similar to computer 500 is virtually provisioned to) one or more entities illustrated in FIG. 1 and/or other aspects of the present disclosure.

Computer 500 includes memory 525, storage 530, interconnect 520 (e.g., a bus), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more buses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the methods described previously and/or implementing any portion of, or all of, the functionalities described previously. Although instructions 560 are shown in memory 525, instructions 560 can include program instructions collectively stored across numerous computer-readable storage media and executable by one or more CPUs 505.

In various embodiments, 110 devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
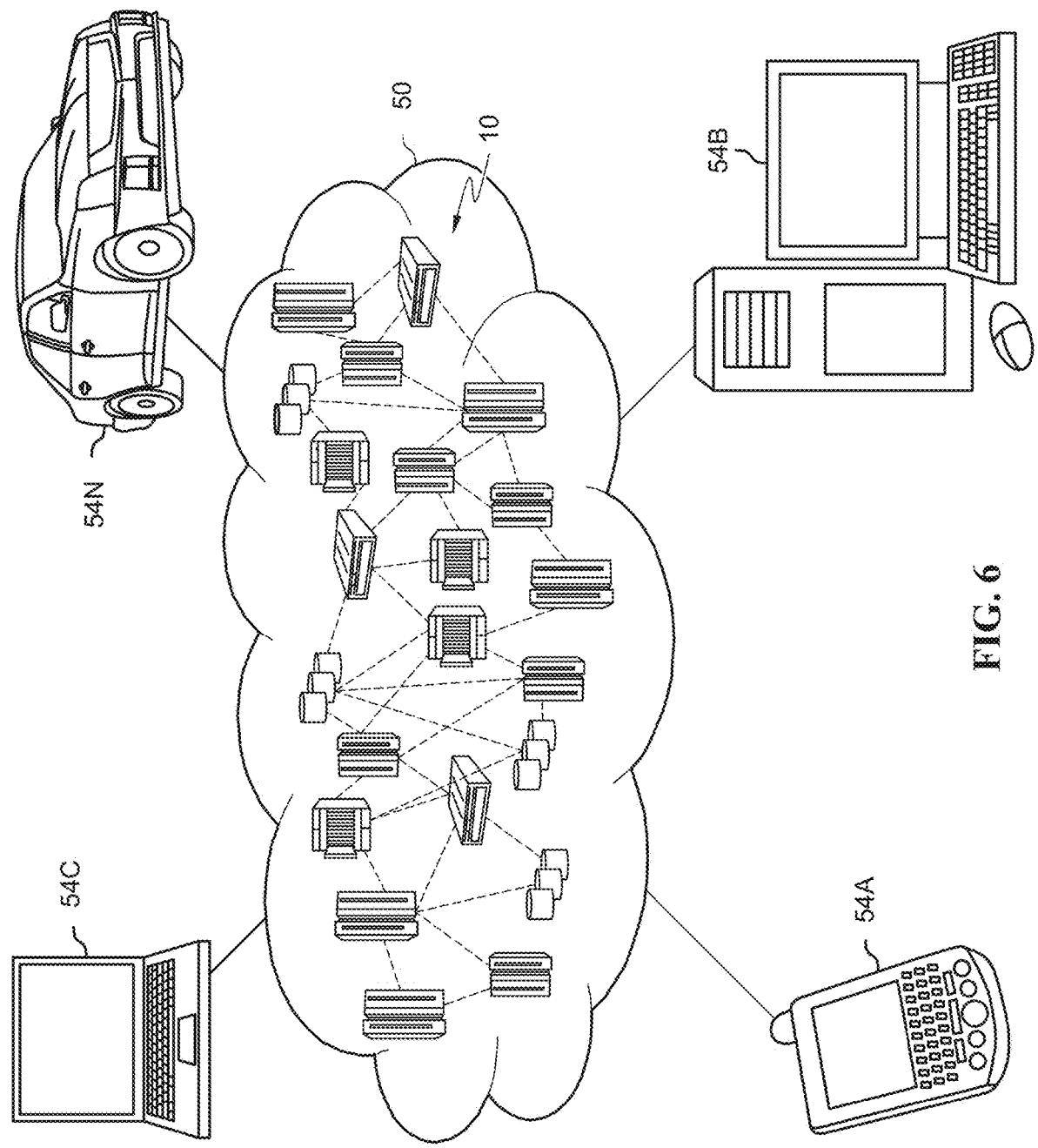
FIG. 6 depicts a cloud computing environment, in accordance with some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
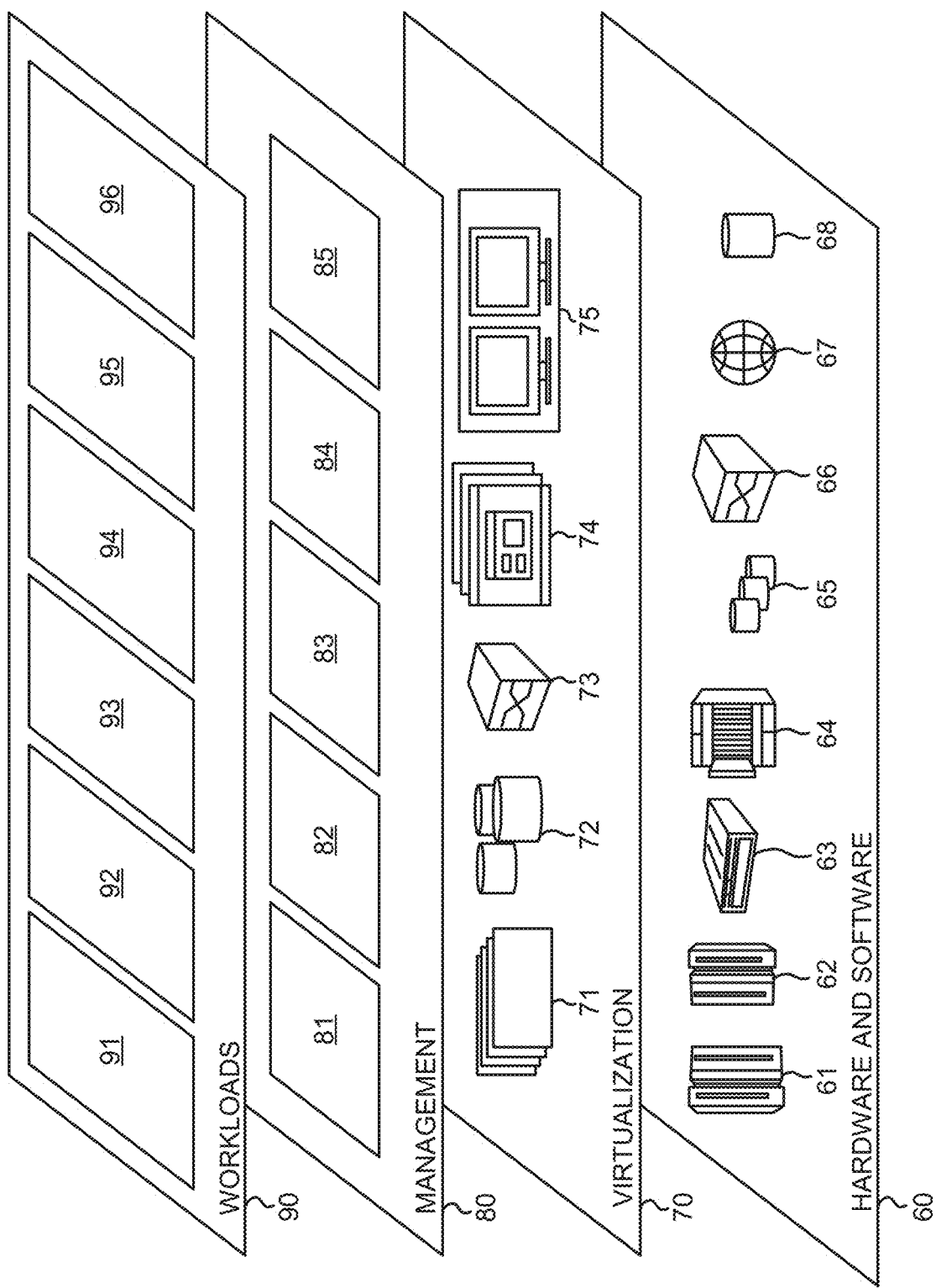
FIG. 7 depicts abstraction model layers, in accordance with some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application hardening 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes generating application traces using fuzzing for an application with a known security vulnerability, wherein the application traces include good traces that do not result in exploitation of the known security vulnerability and bad traces that result in exploitation of the known security vulnerability; identifying code segments that are executed by the bad traces and not executed by the good traces; and modifying the identified code segments using binary rewriting.

Example 2 includes the features of Example 1. In this example, the modifying the identified code segments using binary rewriting further comprises associating trapping instructions with the identified code segments.

Example 3 includes the features of any one of Examples 1 to 2. This example further comprises maintaining, during execution of the application, a moving window of executed blocks forming a back trace of the application; matching the moving window of executed blocks to a portion of one of the bad traces; and performing a mitigation action on the application in response to the matching. Optionally, the mitigation action comprises terminating execution of the application. Optionally, the mitigation action comprises generating a notification related to the known security vulnerability.

Example 4 includes the features of any one of Examples 1 to 3, including or excluding optional features. In this example, the modifying the identified code segments using the binary rewriting is performed on application image file code.

Example 5 includes the features of any one of Examples 1 to 3, including or excluding optional features. In this example, the modifying the identified code segments using the binary rewriting is performed on in-memory application code.

Example 6 includes the features of any one of Examples 1 to 5, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 7 is a system. The system includes one or more computer readable storage media storing program instructions; and one or more processors which, in response to executing the program instructions, are configured to perform a method according to any one of Examples 1 to 6, including or excluding optional features.

Example 8 is a computer program product. The computer program product includes one or more computer readable storage media, and program instructions collectively stored on the one or more computer readable storage media, the program instructions comprising instructions configured to cause one or more processors to perform a method according to any one of Examples 1 to 6, including or excluding optional features.

What is claimed is:

1. A computer-implemented method comprising:
generating application traces using fuzzing for an application with a known security vulnerability, wherein the application traces include good traces that do not result in exploitation of the known security vulnerability and bad traces that result in exploitation of the known security vulnerability;
identifying code segments that are executed by the bad traces and not executed by the good traces; and
modifying the identified code segments using binary rewriting.

2. The method of claim 1, wherein the modifying the identified code segments using binary rewriting further comprises associating trapping instructions with the identified code segments.

3. The method of claim 1, further comprising:
maintaining, during execution of the application, a moving window of executed blocks forming a back trace of the application;
matching the moving window of executed blocks to a portion of one of the bad traces; and
performing a mitigation action on the application in response to the matching.

4. The method of claim 3, wherein the mitigation action comprises terminating execution of the application.

5. The method of claim 3, wherein the mitigation action comprises generating a notification related to the known security vulnerability.

6. The method of claim 1, wherein the modifying the identified code segments using the binary rewriting is performed on application image file code.

7. The method of claim 1, wherein the modifying the identified code segments using the binary rewriting is performed on in-memory application code, wherein the in-memory application code comprises an individual version of the application previously downloaded to a device implementing the application.

8. The method of claim 1, wherein the method is performed by one or more computers according to software that is downloaded to the one or more computers from a remote data processing system.

9. The method of claim 8, wherein the method further comprises:
metering a usage of the software; and
generating an invoice based on metering the usage.

10. A system comprising:
one or more computer readable storage media storing program instructions; and
one or more processors which, in response to executing the program instructions, are configured to perform a method comprising:
generating application traces using fuzzing for an application with a known security vulnerability, wherein the application traces include good traces that do not result in exploitation of the known security vulnerability and bad traces that result in exploitation of the known security vulnerability;

identifying code segments that are executed by the bad traces and not executed by the good traces; and modifying the identified code segments using binary rewriting.

11. The system of claim 10, wherein the modifying the identified code segments using binary rewriting further comprises associating trapping instructions with the identified code segments.

12. The system of claim 10, further comprising:

maintaining, during execution of the application, a moving window of executed blocks forming a back trace of the application;

matching the moving window of executed blocks to a portion of one of the bad traces; and performing a mitigation action on the application in response to the matching.

13. The system of claim 12, wherein the mitigation action comprises terminating execution of the application.

14. The system of claim 12, wherein the mitigation action comprises generating a notification related to the known security vulnerability.

15. The system of claim 10, wherein the modifying the identified code segments using the binary rewriting is performed on application image file code.

16. The system of claim 10, wherein the modifying the identified code segments using the binary rewriting is performed on in-memory application code, wherein the in-memory application code comprises an individual version of the application previously downloaded to a device implementing the application.

17. A computer program product comprising one or more computer readable storage media, and program instructions collectively stored on the one or more computer readable storage media, the program instructions comprising instructions configured to cause one or more processors to perform a method comprising:

generating application traces using fuzzing for an application with a known security vulnerability, wherein the application traces include good traces that do not result in exploitation of the known security vulnerability and bad traces that result in exploitation of the known security vulnerability;

identifying code segments that are executed by the bad traces and not executed by the good traces; and modifying the identified code segments using binary rewriting.

18. The computer program product of claim 17, wherein the modifying the identified code segments using binary rewriting further comprises associating trapping instructions with the identified code segments.

19. The computer program product of claim 17, further comprising:

maintaining, during execution of the application, a moving window of executed blocks forming a back trace of the application;

matching the moving window of executed blocks to a portion of one of the bad traces; and performing a mitigation action on the application in response to the matching, wherein the mitigation action is selected from a group consisting of: terminating execution of the application, and generating a notification related to the known security vulnerability.

20. The computer program product of claim 17, wherein the modifying the identified code segments using the binary rewriting is performed on one selected from a group consisting of: application image file code, and in-memory application code.

* * * * *